United States Patent [19]

Audenaert et al.

[11] Patent Number: 5,466,770
[45] Date of Patent: Nov. 14, 1995

[54] FLUORINE-EFFICIENT OIL- AND WATER-REPELLENT COMPOSITIONS

[75] Inventors: Frans A. Audenaert, Kaprijke; Rudolf J. Dams, Zwijndrecht, both of Belgium; Robert F. Kamrath, Woodbury, Minn.

[73] Assignee: Minnesota Mining and Manufacturing Company, St. Paul, Minn.

[21] Appl. No.: 249,798

[22] Filed: May 26, 1994

[51] Int. Cl.$^6$ .................................................. C08G 18/30
[52] U.S. Cl. .......................... 528/60; 528/70; 528/75; 528/84; 525/85; 525/88; 525/124; 525/131; 524/589; 524/591; 524/599; 524/725; 524/792; 428/241; 428/423.1; 428/424.2; 428/424.6; 428/424.7; 428/260; 428/270; 428/290; 427/372.2; 427/284; 427/385.5; 427/389.9
[58] Field of Search .............................. 528/60, 52, 70, 528/75, 84; 525/85, 88, 124, 131; 524/589, 591, 599, 725, 792; 428/421, 260, 423.1, 270, 424.2, 290, 424.6, 424.7; 427/372.2, 384, 385.5, 389.9

[56] References Cited

U.S. PATENT DOCUMENTS

| | | |
|---|---|---|
| 3,849,521 | 11/1974 | Kirimoto et al. . |
| 4,008,247 | 2/1977 | Tucker . |
| 4,189,601 | 2/1980 | Tucker . |
| 4,190,582 | 2/1980 | Tucker . |
| 4,191,833 | 3/1980 | Tucker . |
| 4,191,834 | 3/1980 | Tucker . |
| 4,834,764 | 5/1989 | Deiner et al. . |
| 5,258,458 | 11/1993 | Allewaert et al. ............... 525/104 |

FOREIGN PATENT DOCUMENTS

| | | |
|---|---|---|
| 5-214325 | 8/1993 | Japan . |
| 5-222149 | 8/1993 | Japan . |
| WO92/17636 | 10/1992 | WIPO . |

OTHER PUBLICATIONS

Banks Ed., Organofluorine Chemicals and Their Industrial Applications, Ellis Horwood Ltd., Chichester, England 1979, pp. 226–234.

Kirk–Othmer, Encyclopedia of Chemical Technology, 3rd Ed., vol. 24, pp. 448–451.

Primary Examiner—James J. Seidleck
Assistant Examiner—Dvc Truong
Attorney, Agent, or Firm—Gary L. Griswold; Walter N. Kirn; Robert H. Brink

[57] ABSTRACT

The invention provides new fluorine-efficient oil- and water-repellent compositions comprising a fluorochemical oil- and water-repellent agent and a polymer extender comprising at least one percent by weight based on the weight of the extender of interpolymerized units derived from monomers containing at least one blocked or masked isocyanate function.

20 Claims, No Drawings

FLUORINE-EFFICIENT OIL- AND WATER-REPELLENT COMPOSITIONS

This invention relates to compositions comprising a fluorochemical oil- and water-repellent agent and an extender. This invention, in another aspect, relates to a method for imparting oil- and water-repellent properties to fibrous substrates and to the resulting treated substrates.

The use of various fluorochemical compositions on fibers and fibrous substrates, such as textiles, paper, and leather, to impart oil and water repellency is known. See, for example, Banks, Ed., *Organofluorine Chemicals and Their Industrial Applications,* Ellis Horwood Ltd., Chichester, England, 1979, pp. 226–234. Fluorochemicals are generally expensive. So-called "extenders" have therefore been developed in order to reduce cost. Extenders are relatively inexpensive compared to fluorochemicals and they are a means of increasing the fluorine-efficiency of a fluorochemical treatment. Modified synthetic resins, waxes, paraffin emulsions, and similar products have been used as extenders.

U.S. Pat. No. 3,849,521 (Kirimoto et al.) describes water- and oil-repellent compositions containing an oil- and water-repellent fluoroalkyl-containing polymer and an additive copolymer containing monomer units having the formula $CR_1R_2=CR_3COOR_4$, wherein $R_1$, $R_2$ and $R_3$ represent hydrogen atoms or methyl groups, and $R_4$ represents a $C_{1-18}$ alkyl group; and monomer units having the formula $CH_2=CR_5CONHCH_2OH$, wherein $R_5$ represents a hydrogen atom or a methyl group.

U.S. Pat. No. 4,834,764 (Deiner et al.) describes the use of certain blocked isocyanate compounds in combination with reactive perfluoroalkyl containing (co)polymers. Such compounds are said to improve the oil and water repellency and also make possible a reduction in the amount of fluoroalkyl-containing compounds.

World patent publication WO92/17636 (Dams et al.) describes certain compositions comprising a fluorochemical agent, a copolymer extender, and a blocked isocyanate extender.

Briefly, in one aspect, the present invention provides a fluorochemical composition comprising (A) a fluorochemical oil- and water-repellent agent; and (B) a polymer extender comprising a saturated carbon-carbon backbone chain and at least one percent by weight, based on the weight of the extender, of interpolymerized units derived from ethylenically unsaturated monomer containing at least one blocked or masked isocyanato group or function. Preferably, said polymer extender further comprises interpolymerized units derived from ethylenically unsaturated monomer free of blocked or masked isocyanato groups or functions.

In another aspect, the present invention provides a method for imparting oil- and water-repellent properties to a fibrous substrate comprising the steps of; (1) applying to the surface of a fibrous substrate an amount of the composition of this invention effective to impart oil- and water-repellent properties to the substrate, wherein said fluorochemical agent and said polymer extender are present in a total combined amount of 0.02% to 3% by weight based on the weight of the fibrous substrate, and (2) heating the treated substrate from step 1 at a temperature and for a time sufficient to cure the treated substrate.

In another aspect, this invention provides substrates treated with the fluorochemical composition of this invention.

The polymer extenders useful in the compositions of this invention can act as excellent extenders in treatment of fibrous substrates, thus allowing more efficient use of the generally more expensive fluorochemical agent.

In general, fluorochemical agents useful in this invention include any of the known fluoroaliphatic radical-containing agents useful for the treatment of fabrics to obtain oil and water repellency. The fluoroaliphatic radical, called $R_f$ for brevity, is stable, inert, non-polar, preferably saturated, monovalent and both oleophobic and hydrophobic. The $R_f$ group preferably contains at least about 3 carbon atoms, more preferably 3 to about 20 carbon atoms, and most preferably about 6 to about 14 carbon atoms. $R_f$ can contain straight chain, branched chain, or cyclic fluorinated alkylene groups or combinations thereof with straight chain, branched chain, or cyclic alkylene groups. $R_f$ is preferably free of polymerizable olefinic unsaturation and can optionally contain catenary heteroatoms such as oxygen, divalent or hexavalent sulfur, or nitrogen. It is preferred that $R_f$ contains about 40% to about 80% fluorine by weight, more preferably about 50% to about 78% fluorine by weight. The terminal portion of the $R_f$ group is fully fluorinated preferably containing at least 7 fluorine atoms, e.g., $CF_3CF_2CF_2-$, $(CF_3)_2CF-$, $-CF_2SF_5$, or the like. Perfluorinated aliphatic groups (i.e., those of the formula $C_nF_{2n+1}$) are the most preferred embodiments of $R_f$.

Examples of useful fluorochemical agents include, for example, $R_f$-containing urethanes, ureas, esters, amines (and salts thereof), amides, acids (and salts thereof), carbodiimides, guanidines, allophanates, biurets, oxazolidinones, and other substances containing one or more $R_f$ groups, as well as mixtures and blends thereof. Such agents are well known to those skilled in the art, see e.g., Kirk-Othmer, *Encyclopedia of Chemical Technology,* 3rd Ed., Vol. 24, pp. 448–451 and many (e.g., SCOTCHGARD™ Fabric Protector, 3M) are commercially available as ready-made formulations. Useful fluorochemical agents can be polymers containing multiple $R_f$ groups such as copolymers of fluorochemical acrylate and/or methacrylate monomers with copolymerizable monomers.

The polymer extenders of this invention comprise interpolymerized units derived from ethylenically-unsaturated monomers containing at least one blocked or masked isocyanato group or function. These monomers can be represented by Formula I.

In Formula I, X is an organic residue, and R is an organic residue containing at least one ethylenically unsaturated polymerizable group. Monomers of Formula I can be prepared by reacting an ethylenically unsaturated isocyanate, R-NCO, with a blocking agent, HX, wherein the blocking agent is removable from the isocyanate under thermal conditions such as those employed during cure of a fibrous substrate treated with a compound containing the blocked isocyanato group.

Monomers of Formula I can be derived from monoisocyanates or from multi-valent isocyanates. Suitable monoisocyanates are, for example, m-isopropenyl dimethylbenzyl isocyanate (m-TMI, American Cyanamid), methacryloyl isocyanate (MAI, Nippon) and 2-isocyanatoethyl methacrylate (IEM, Dow Chemical). Preparation of blocked urethanes is well-known to those skilled in the art. Several blocked m-TMI adducts are available from Allied Signal, e.g., acetone oxime blocked m-TMI, and caprolactam blocked m-TMI.

Conventional isocyanate blocking or masking agents include alcohols such as 1,6-hexanediol, ethylene glycol, methanol, ethanol, n-propyl alcohol, isopropyl alcohol, n-butyl alcohol, isobutyl alcohol, t-butyl alcohol, n-amyl alcohol, t-amyl alcohol, 2-ethylhexanol, glycidol; aryl alcohols (e.g., phenols, cresols, nitrophenols, o- and p-chlorophenol, naphthols, 4-hydroxybiphenyl); $C_2$ to $C_8$ alkanone oximes (e.g., acetone oxime, butanone oxime); benzophenone oxime; aryl-thiols (e.g., thiophenol); organic carbanion active hydrogen compounds (e.g., diethyl malonate, acetylacetone, ethyl acetoacetate, ethyl cyanoacetate); epsilon-caprolactam; a primary or secondary amine (e.g., butyl amine); hydroxylamine; and primary amino mercaptan and secondary amino mercaptans. Particularly preferred blocked or masked isocyanates include those blocked or masked with $C_2$ to $C_8$ alkanone oximes, e.g., 2-butanone oxime, with a phenol, with a lactam, with 2-ethylhexanol, or with glycidol.

A class of the monomers of Formula I which can be derived from multi-valent isocyanates can be represented by Formula II.

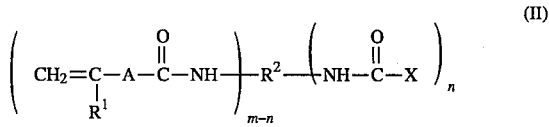

(II)

In Formula II, n is 1 to 3, $R^1$ is a hydrogen atom or a methyl group, A is a divalent organic linking group, $R^2$ is a bi-, tri-, or tetravalent organic residue of valence m derived from a bi-, tri-, or tetrafunctional aliphatic, cycloaliphatic, aromatic or heterocyclic isocyanate compound $R_2(NCO)_m$, X is the residue remaining after an active hydrogen atom is removed from a blocking or masking agent HX, and wherein m−n is 1, 2, or 3. The monomers of Formula II can be prepared in a two-step process wherein an ethylenically unsaturated functional monomer, for example, hydroxy- or amino-functionalized acrylate or methacrylate, is reacted with an di-, tri-, or tetraisocyanate, followed by reaction of the resulting product with the blocking or masking agent.

The preparation of ethylenically unsaturated blocked diisocyanates of Formula I wherein m is 2, is described, for example, in U.S. Pat. Nos. 4,008,247 (Tucker, 1977), 4,189,601 (Tucker, 1980), 4,190,582 (Tucker, 1980), 4,191,834 (Tucker, 1980), and 4,191,833 (Tucker, 1980).

Ethylenically unsaturated blocked or masked triisocyanates or tetraisocyanates within the scope of Formula II can be prepared analogously to the procedure for diisocyanates. Although few tetraisocyanates are commercially available, they can be prepared via reaction of a tetrol with diisocyanates in a molar ratio of 1 to 4, e.g., 1 mole pentaerythritol is reacted with 4 moles of 2,4-toluene diisocyanate.

Suitable isocyanates $R_2(NCO)_m$ for use in preparing the monomers of Formula II include aromatic diisocyanates such as 4,4'-methylene-diphenylene diisocyanate (MDI) and 2,4-toluene diisocyanate (2,4-TDI); alicyclic diisocyanates such as 3-isocyanatomethyl- 3,5,5-trimethylcyclohexyl isocyanate; aliphatic diisocyanates such as methylene diisocyanate, 1,6-hexamethylene diisocyanate, 2,2,4-trimethyl-1,6-hexamethylene diisocyanate, and 1,2-ethylene diisocyanate; aliphatic triisocyanates such as 1,3,6-hexamethylenetriisocyanate; aromatic polyisocyanates such as polymethylene-polyphenyl-isocyanate (PAPI); and cyclic diisocyanates such as isophorone diisocyanate (IPDI). Preferred among the diisocyanates are isophorone diisocyanate and 2,4-toluene diisocyanate.

Also useful are isocyanates containing internal isocyanate-derived moieties such as biuret-containing triisocyanates such as that available from Mobay Bayer (as DESMODUR™ N-100), isocyanurate-containing triisocyanates such as that available from Huels AG, Germany (as IPDI-1890), and azetidinedione-containing diisocyanates such as that available from Bayer (as DESMODUR™ TT). Also, triisocyanates such as tri-(4-isocyanatophenyl)-methane (available from Bayer as DESMODUR™ R) are suitable.

The polymer extenders useful in this invention preferably further contain interpolymerized units derived from ethylenically unsaturated monomer free of blocked or masked isocyanato groups or functions. These monomers are those ethylenically unsaturated compounds capable of free-radical polymerization. A particularly preferred class of these monomers comprises acrylate and methacrylate monomers.

The preparation of the polymer extenders useful in this invention can be carried out by solution, suspension, or emulsion polymerization known to those skilled in the art.

A composition of the invention comprises the fluorochemical agent in an amount sufficient to impart repellent properties to a fibrous substrate treated with the composition. The amount of fluorochemical agent that constitutes an effective amount can be easily determined to those skilled in the art and depends on the particular fluorochemical agent used and on the amount of the copolymer extender used.

The copolymer extender is present in an amount sufficient to improve the fluorine efficiency of the fluorochemical agent. "Improvement in fluorine efficiency" as used herein designates an improvement in the repellent properties imparted by a fluorochemical agent per unit weight of fluorine in a composition comprising the agent, as those repellent properties are measured using the test procedures set forth below.

Generally, the fluorochemical agent is present in an amount of about 20 to about 2000, preferably 40 to about 1500, and most preferably about 100 to about 400, parts by weight based on 100 parts by weight of the copolymer extender.

When a composition of this invention is applied as a treatment to a fibrous substrate, e.g., a fabric intended for use in a garment, it is preferred that the treated substrate comprise the fluorochemical agent and the copolymer extender in a total combined amount of about 0.02% to about 3% by weight based on the weight of the untreated substrate.

The composition of this invention can be applied using conventional application methods and can be used as a treatment agent in a solvent. Preferred solvents are ketones, ethers and esters or mixtures thereof. Alternatively, a composition can be prepared in the form of an aqueous dispersion and the substrate treated therewith. A dispersion will generally contain water, an amount of composition effective to provide repellent properties to a substrate treated therewith, and an emulsifier in an amount effective to stabilize the dispersion. Water is preferably present in an amount of about 70 to about 900 parts by weight based on 100 parts by weight of the composition of the invention. The emulsifier is preferably present in an amount of about 1 to about 25 parts by weight, preferably about 5 to about 10 parts by weight, based on 100 parts by weight of the composition of the invention. Conventional cationic, nonionic, anionic, and zwitterionic emulsifiers are suitable.

In order to effect treatment of a substrate, the substrate can be immersed in the dispersion and agitated until it is saturated. The saturated substrate can then be run through a padder/roller to remove excess dispersion, dried in an oven at a relatively low temperature (e.g., 70° C.) for a time sufficient to remove the dispersion medium (e.g., water, ethylene glycol, or a mixture thereof), and cured at a temperature and for a time sufficient to provide a cured treated substrate. This curing process can be carried out at temperatures between 110° C. and about 190° C. depending on the particular composition used. In general, a temperature of about 150° C. for a period of about 1 to 10 minutes, preferably 3 to 5 minutes, is suitable. The cured treated substrate can be cooled to room temperature and used as desired, e.g., incorporated or fashioned into a garment such as rainwear.

In order to improve fixing of a fluorinated compound of the invention to a substrate, it is sometimes advantageous to include in the dispersion certain additives, polymers, thermo-condensable products and catalysts capable of promoting interaction with the substrate. Among these are the condensates or precondensates of urea or melamine with formaldehyde (sometimes referred to herein as resins) and glyoxal resins.

Other auxiliary extenders can be used, either alone or in combination with each other. Suitable auxiliary extenders include paraffin; compositions containing alkyl-ketenes or derivatives thereof; siloxanes; chlorohydrates of stearamidomethylpyridinium; condensates of fatty acids with melamine or urea derivatives (such as the product obtained on reacting stearic acid with hexamethoxymethylmelamine), condensates of fatty acids with polyamides (such as the reaction product of stearic acid with diethylenetriamine) and their epichlorohydrin adducts. It is also possible to use salts of inorganic or organic acids such as aluminum stearate, zirconium acetate, zirconium oxychloride or Werner complexes such as chromium stearatochloride.

If it is desired to improve the softness or "hand" of a substrate treated with a composition of the invention, it is possible to use softeners, such as certain polyethylenes, polydimethylsiloxanes, modified hydrogen-alkylpolysiloxanes, or other materials known to those skilled in the art.

In combination with compositions of this invention it is also possible to use auxiliary products such as polyglycols, colloids such as starch, dextrin, casein, sizing agents, fixing or retaining agents, materials to improve stain resistance, cleaning ability, fire proofing or antistatic properties, buffering agents, fungicidal agents, optical bleaching agents, sequestering agents, mineral salts, surface-activity agents, or swelling agents to promote penetration. Particular suitable auxiliary products and amounts thereof can be easily selected by those skilled in the art.

In addition to providing oil- and water-repellent properties to substrates, the composition of the invention can also be used to provide anti-adhesion properties and to protect substrates against solvents or certain aggressive chemicals. They can also be used for applications such as stain resistance, soil resistance, soil release and stain release on textiles, paper, or leather. Further, they can be used for imparting properties such as antistatic, antipilling, mold release, corrosion inhibition, or anti-fouling properties.

EXAMPLES

The following nonlimiting examples further describe and illustrate this invention. Given below is a glossary of acronyms which describe various substances used in the examples:

MeFOSEA=$C_8F_{17}SO_2N(CH_3)CH_2CH_2OC(O)CH=CH_2$ (available from 3M)

MeFOSEMA=$C_8F_{17}SO_2N(CH_3)CH_2CH_2OC(O)C(CH_3)=CH_2$ (available from 3M)

EHMA=$n-C_4H_9CH(C_2H_5)CH_2OC(O)C(CH_3)=CH_2$

EHA=$n-C_4H_9CH(C_2H_5)CH_2OC(O)CH=CH_2$

TDA=$C_{13}H_{27}OC(O)CH=CH_2$

ODMA=$n-C_{18}H_{37}OC(O)C(CH_3)=CH_2$

N-MAM=$HOCH_2NHC(O)CH=CH_2$ (48 wt % aqueous solution)

IPDI=isophorone diisocyanate 2,4-TDI=2,4-toluene diisocyanate m-TMI=m-isopropenyl dimethylbenzylisocyanate (American Cyanamid)

HOEA=hydroxyethyl acrylate

HOEMA=hydroxyethyl methacrylate

MMA=methyl methacrylate $VCl_2$=vinylidene chloride

Sipomer™Q-6=$CH_2=C(CH_3)C(O)OC_2H_4N^+(CH_3)_3$ $Cl^-$ (75% solution) (Rhone-Poulenc)

AIBN=2,2'azobisisobutyronitrile

Synthesis of Fluorochemical Agents FC1 to FC5

Table 1 lists the raw material charges used in the preparation of oil- and water-repellent fluorochemical polymer emulsions FC1 through FC5 to be evaluated with extenders. Also listed is the percent solids for each emulsion. For the synthesis of FC1, the monomers and other ingredients were charged to a 900 mL narrow mouth polymerization bottle; for the syntheses of FC2 to FC5, ingredients were charged to 225 mL narrow mouth bottles. In all cases, the reaction mixture was deaerated and then covered with a nitrogen atmosphere, the bottle was capped, and the polymerization was allowed to run for 16 hours in a Launder-o-meter™ laboratory reactor set at 73° C. Acetone was removed from the resulting transparent dispersion using vacuum distillation at 30 torr (FC1, FC4, and FC5) or atmospheric distillation (FC2 and FC3). The percent solids for each emulsion was determined by evaporating a small sample for 2 hours in a forced-air oven set at 105° C.

TABLE 1

| Component: | Wt. (g) used in fluorochemical agent: | | | | |
|---|---|---|---|---|---|
| | FC1 | FC2 | FC3 | FC4 | FC5 |
| Monomer: | | | | | |
| MeFOSEA | 150.0 | 41.24 | 52.24 | | |
| MeFOSEMA | | | | 20.0 | 64.0 |
| EHMA | 37.5 | | | | 16.0 |
| TDA | | 13.76 | 2.76 | | |
| ODMA | | | | 14.8 | |
| Sipomer ™Q-6 (75% solids) | | 0.184 | 0.184 | | |
| $VCl_2$ | | | | 4.0 | |
| N-MAM | | | | 2.0 | |
| Initiator: V-50 ™ (Wako) | 0.94 | 0.11 | 0.11 | 0.2 | 0.4 |
| Chain Terminator: | | | | | |
| $n-C_8H_{17}SH$ | 1.4 | | | 0.2 | 0.2 |
| $t-C_{12}H_{25}SH$ | | 0.28 | 0.28 | | |
| Emulsifier: Ethoquad ™ 18/25 (Akzo) | 9.4 | 2.76 | 2.76 | 2.0 | 4.0 |

TABLE 1-continued

| Component: | Wt. (g) used in fluorochemical agent: | | | | |
|---|---|---|---|---|---|
| | FC1 | FC2 | FC3 | FC4 | FC5 |
| Solvent | | | | | |
| Acetone | 110 | 21.64 | 21.64 | 24.5 | 49.4 |
| Water | 437 | 86.56 | 86.56 | 98.0 | 197.4 |
| Percent solids in latex: | 31.1 | 38.3 | 37.3 | 30.6 | 28.7 |

Synthesis of Urethane Monomers UM1 to UM6

Table 2 lists the raw material charges used to synthesize the urethane monomers UM1 to UM6 which were used to prepare the copolymer extenders of this invention. Also shown is the percent solids of each resultant monomer in solvent solution. In each case, the isocyanate, solvent, phenothiazine, hydroquinone monomethyl ether (MEHQ), and catalyst were charged to a 2-L 3-neck flask equipped with a thermometer, reflux condenser, dropping funnel, mechanical stirrer, electric heating mantle, and nitrogen inlet. The reaction mixture was heated to 60° C. with stirring, and the active hydrogen-containing acrylic monomer was added over a two hour period. After an additional four hour reaction at 65° C., the mixture was cooled to 55° C., and the isocyanate blocking agent was added dropwise over a two hour period while keeping the flask temperature below 70° C. The reaction mixture was stirred for an additional two hours at 60° C., at which time the isocyanate functional groups were shown by FT-IR spectroscopy to have been essentially fully reacted. In the case of UM2, 503 g acetone and 849 g 1-methyl-2-pyrrolidone were added to ensure solubility at room temperature. The final % solids of UM2 was 32%.

TABLE 2

| Component: | Wt. (g) used in urethane monomer: | | | | | |
|---|---|---|---|---|---|---|
| | UM1 | UM2 | UM3 | UM4 | UM5 | UM6 |
| Isocyanate: | | | | | | |
| IPDI | 444 | — | 222 | — | 111 | — |
| 2,4-TDI | — | 348 | — | — | — | 87 |
| m-TMI | — | — | — | 201 | — | — |
| Active hydrogen-containing acrylic monomer: | | | | | | |
| HOEA | 232 | 232 | 116 | — | — | — |
| HOEMA | — | — | — | — | 65 | 65 |
| Blocking agent for isocyanate: | | | | | | |
| 2-Butanone oxime | 174 | 174 | — | 87 | 43.5 | 43.5 |
| 2-Ethyl-hexanol | — | — | 130 | — | — | — |
| Catalysts and inhibitors: | | | | | | |
| Phenothiazine | 0.128 | 0.113 | 0.070 | — | 0.033 | 0.029 |
| MEHQ | 0.128 | 0.113 | 0.070 | — | 0.033 | 0.029 |
| Stannous octoate | 0.213 | 0.189 | 0.117 | 0.144 | — | — |
| Dibutyl tin dilaurate | — | — | — | — | 0.055 | 0.048 |
| Solvent: | | | | | | |
| Ethyl acetate | 283 | 251 | 156 | 96 | — | — |
| Methyl isobutyl ketone | — | — | — | — | 219.5 | 195.5 |

TABLE 2-continued

| Component: | Wt. (g) used in urethane monomer: | | | | | |
|---|---|---|---|---|---|---|
| | UM1 | UM2 | UM3 | UM4 | UM5 | UM6 |
| Percent solids | 75 | 75 | 75 | 75 | 50 | 50 |

Synthesis of Extenders E1 to E3 and Comparative Extenders CE1 and CE2

Table 3 lists the monomer charges used for the emulsion polymerization of several urethane extenders of this invention (E1 to E3), comparative urethane-free extenders (CE1 to CE2), and the resultant percent solids produced from each aqueous emulsion polymerization. In each case, the extender copolymer was prepared using the following procedure: A 1-L 3-neck glass reaction flask, equipped with a thermometer, reflux condenser, mechanical stirrer, electric heating mantle and nitrogen inlet tube, was charged successively with acrylate monomer(s), a urethane monomer (urethane extenders only), Ethoquad™ 18/25 surfactant, deionized water, V-50™ initiator, and n-octyl mercaptan. Following a thorough purging of the charged ingredients with nitrogen, the reaction mixture was stirred and reacted for 6 hours at 75° C. under a nitrogen blanket, after which time the polymerization was determined to be >95% complete (glc). Residual solvent was subsequently removed by vacuum distillation, yielding a stable aqueous polymer dispersion. Percent solids for each extender polymer was determined by measuring solvent weight loss (done by evaporating a few grams of polymer solution in a dish placed in a forced air oven set at 105° C. for around 2 hours).

TABLE 3

| Component: | Wt. (g) used in entender copolymer: | | | | |
|---|---|---|---|---|---|
| | E1 | E2 | E3 | CE1 | CE2 |
| Monomer: | | | | | |
| UM1 (75% solids) | 26.7 | — | — | — | — |
| UM2 (32% solids) | — | 31.3 | — | — | — |
| UM3 (75% solids) | — | — | 13.3 | — | — |
| EHMA | 80 | 40 | 40 | 25 | 47.5 |
| N-MAM (48% solids) | — | — | — | — | 2.5 |
| Initiator: V-50 ™ (Wako) | 0.5 | 0.25 | 0.25 | 0.125 | 0.15 |
| Chain terminator: n-C$_8$H$_{17}$SH | 0.5 | 0.375 | 0.375 | 0.188 | 0.375 |
| Emulsifier: Ethoquad ™ 18/25 (Akzo) | 5 | 2.5 | 2.5 | 1.25 | 2.5 |
| Added solvent: | | | | | |
| Water | 300 | 150 | 150 | 58.3 | 119 |
| Acetone | — | — | — | 14.6 | — |
| Percent solids | 25 | 25 | 25 | 27 | 31 |

Table 4 lists the monomer charges used for preparation of extenders E4 to E12 and comparative extender CE3. For the synthesis of each extender, a 225 mL narrow mouth bottle was charged with the monomers and other ingredients, the mixture was deaerated and covered with a nitrogen atmosphere, the bottle was capped, and the polymerization was allowed to run in a Launder-o-meter™ laboratory reactor for 16 hours at 70°–73° C. Each polymerized extender yielded a stable dispersion in water. Percent solids was measured in the same way as with extenders E1–E3 and comparative extenders CE1–CE2.

TABLE 4

| Component: | Wt. (g) used in extender copolymer: | | | | | | | | | |
|---|---|---|---|---|---|---|---|---|---|---|
| | E4 | E5 | E6 | E7 | E8 | E9 | E10 | E11 | E12 | CE3 |
| Monomer: | | | | | | | | | | |
| UM1 (75% solids) | 7.33 | 10.67 | 10.67 | 10.67 | 10.67 | 10.67 | 10.67 | 10.67 | — | — |
| UM4 (75% solids) | — | — | — | — | — | — | — | — | 5.33 | — |
| EHMA | — | — | 16.0 | 24.0 | 28.0 | — | 28.0 | 31.2 | 36.0 | — |
| EHA | — | — | — | — | — | 32.0 | — | — | — | — |
| $VCl_2$ | — | 32.0 | 16.0 | 8.0 | 4.0 | — | — | — | — | — |
| N-MAM (48% solids) | — | — | — | — | — | — | 8.3 | — | — | — |
| HOEA | — | — | — | — | — | — | — | 0.8 | — | — |
| TDA | 13.75 | — | — | — | — | — | — | — | — | 16.5 |
| MMA | 8.25 | — | — | — | — | — | — | — | — | 11.0 |
| Initiator: V-50 ™ (Wako) | 0.055 | 0.2 | 0.2 | 0.2 | 0.2 | 0.2 | 0.2 | 0.2 | 0.2 | 0.055 |
| Chain terminator: n-$C_8H_{17}$SH | — | 0.3 | 0.3 | 0.3 | 0.3 | 0.3 | 0.3 | 0.3 | 0.3 | — |
| Emulsifier: Ethoquad ™ 18/25 (Akzo) | 1.38 | 2.0 | 2.0 | 2.0 | 2.0 | 2.0 | 2.0 | 2.0 | 2.0 | 1.38 |
| Added solvent: | | | | | | | | | | |
| Water | 43.28 | 120 | 120 | 120 | 120 | 120 | 120 | 120 | 120 | 37.87 |
| Acetone | 9.0 | — | — | — | — | — | — | — | — | 16.23 |
| Percent solids | 39.0 | 23.8 | 24.8 | 24.8 | 24.6 | 24.5 | 24.8 | 25.0 | 24.5 | 44.2 |

Synthesis of Extender E13 and E14

Table 5 lists charges of ingredients used for preparation by solution polymerization of extenders E13 and E14. The ingredients for synthesizing extender E13 were charged to a 237 mL (8 oz) narrow mouth bottle, while ingredients for synthesizing extender E14 were charged to a 473 mL (16 oz) narrow mouth bottle. In both cases, the reaction mixtures were deaerated and covered with a nitrogen atmosphere. The bottles were capped and the polymerizations were run for 20 hours in a Launder-o-meter™ laboratory reactor set at 65° C. The resultant extender solvent solutions were clear to slightly hazy.

The extender solvent solutions were then emulsified in water. For extender E13, 0.3 g of Ethoquad™ 18/25 emulsifier was dissolved in 25.2 g of deionized water and the solution was heated to 65° C. The solvent solution of extender E13 was also heated to 65° C. and 30 g was added to the aqueous emulsifier solution while stirring vigorously. This pre-emulsion was converted into a stable aqueous dispersion using a Branson 250 Sonifier. Residual methyl isobutyl ketone was stripped off using a Buchi rotovapor with waterjet vacuum. The final emulsion dispersion was 18.1% solids.

TABLE 5

| Component: | Wt. (g) used in extender copolymer: | |
|---|---|---|
| | E13 | E14 |
| Monomer: | | |
| UM5 (50%) | 50 | 20 |
| HOEMA | — | 40 |
| Initiator: AIBN | 0.25 | 0.5 |
| Chain Terminator: n-$C_8H_{17}$SH | 0.5 | — |
| Solvent: Methyl isobutyl ketone | 75 | 140 |

TABLE 5-continued

| Component: | Wt. (g) used in extender copolymer: | |
|---|---|---|
| | E13 | E14 |
| Percent solids | 20 | 25 |

The same procedure was used to emulsify the solvent solution of extender E14, except that the quantities of materials used were 1.25 g of Ethoquad™ 18/25 emulsifier, 78.75 g of deionized water, and 100 g of solvent solution of extender 14, to give a final emulsion dispersion which was 27.9% solids.

Synthesis of Extenders E15 and E16

Table 6 lists charges of ingredients used for preparation by emulsion polymerization of extenders E15 and E16. In both cases, ingredients were charged to a 473 mL narrow mouth bottle, the reaction mixtures were deaerated and covered with a nitrogen atmosphere, the bottles were capped, and the polymerizations were run for 20 hours in a Launder-o-meter™ laboratory reactor set at 65° C. Both extender polymers formed a stable dispersion in water.

TABLE 6

| Component: | Wt. (g) used in extender copolymer: | |
|---|---|---|
| | E15 | E16 |
| Monomer: | | |
| UM5 (50%) | — | 16 |
| UM6 (50%) | 32 | — |
| EHMA | 64 | 72 |
| Initiator: V-50 ™ (Wako) | 0.4 | 0.4 |
| Chain Terminator: n-$C_8H_{17}$SH | 0.2 | 0.2 |
| Emulsifier: Ethoquad ™ 18/25 | 4 | 4 |

TABLE 6-continued

| Component: | Wt. (g) used in extender copolymer: | |
|---|---|---|
| | E15 | E16 |
| (Akzo) | | |
| Added Solvent: Water | 197.4 | 197.4 |
| Percent solids | 28.3 | 30.0 |

Synthesis of Comparative Extenders CE4 to CE7

Table 7 lists charges of ingredients used for preparation by solution polymerization of comparative extenders CE4 to CE7. In each case, the solvent and isocyanate were charged to a three-neck, round bottom flask (250 mL for CE4, CE5 and CE6; 1-L for CE7) equipped with a thermometer, reflux condenser, mechanical stirrer, dropping funnel, electric heating mantle and nitrogen inlet tube. The flask was flushed with nitrogen, the isocyanate solution was heated to 50° C., and the oxime blocking agent was added via the dropping funnel. As a slight exotherm was typically observed, the rate of oxime addition was adjusted so that the reaction temperature did not exceed 85° C. After oxime addition was completed, the reaction was allowed to proceed for 3 hours at 75° C., after which time the isocyanate functionality had been converted to urethane functionality as shown by FT-IR spectroscopy. The final comparative extender solutions were all amber and slightly hazy. Comparative extender CE7 solvent solution was further diluted from 60% solids to 40% solids with ethyl acetate prior to post-emulsification.

TABLE 7

| Component: | Wt. (g) used in extender copolymer: | | | |
|---|---|---|---|---|
| | CE4 | CE5 | CE6 | CE7 |
| Isocyanate: | | | | |
| DDI-1410 (Henkel) | 45.0 | — | — | — |
| Desmodur-L (Bayer AG) | — | 64.6 | — | — |
| IPDI-1890 (Huls AG) | — | — | 44.4 | — |
| PAPI (Dow Chemical) | — | — | — | 337.5 |
| Blocking agent for isocyanate: 2-Butanone oxime | 26.1 | 17.4 | 17.4 | 217.5 |
| Solvent: Ethyl acetate | 106.7 | 123 | 92.7 | 370 |
| Percent solids | 40.0 | 40.0 | 40.0 | 60.0 |

The comparative extender solvent solutions were then post-emulsified in water. In each case, 2 g of Ethoquad™ 18/25 emulsifier was dissolved in 126 g of deionized water and was heated to 65° C. 100 g of the solvent solution (providing 40 g solids) was also heated to 65° C. and was added to the aqueous emulsifier solution while stirring vigorously. This pre-emulsion was converted to a stable aqueous dispersion using a Branson 250 Sonifier. The ethyl acetate solvent was stripped off using a Buchi rotovapor with waterjet vacuum. The final percent solids for each comparative extender was 22.1% for CE4, 19.5% for CE5, 24.5% for CE6 and 25.8% for CE7.

Formulation and Treatment Procedure

Treated baths were formulated containing the fluorochemical agents and the extenders prepared above. To the baths were added 0.1% acetic acid for pH control. Treatments were applied by padding at the indicated percent solids on the test fabric (based on fabric weight), and drying and curing at 150° C. for 3 to 5 minutes. Test fabrics used were: 65/35 polyester/cotton, white woven fabric consisting of 65/35 Dacron™/cotton poplin, bleached, style #7436, obtained through Test-fabrics, Inc., U.S.A.; 65/35 polyester/cotton grey fabric; 65/35 style No. 2681, obtained through Utexbel N.V.; 100% cotton bleached mercerized cotton poplin, style #407, obtained from Test-fabrics, Inc.; 100% polyamide fabric, obtained from Sofinal N.V.; 100% polyamide D5 Red nylon taffeta, obtained from Test-fabrics, Inc.; and pigmented spunlaced non-woven fabric (cellulose/polyester), obtained from Lantor UK.

Treated test fabrics were evaluated using the test methods set forth below.

Water Spray Test (SR)

The resistance of a treated substrate to wetting with water was measured using AATCC Test Method 22–1977, "Water Repellency: Spray Test", as described in American Association of Textile Chemists and Colorists Technical Manual, 1977, 53, 245. Samples are rated on a scale of 0 to 100, with 0 indicating complete wetting of the upper and lower surfaces of the substrate and 100 indicating no wetting.

Water Repellency Test (WR)

The water repellency (WR) of a treated substrate was measured using a series of water-isopropyl alcohol test liquids and was expressed in terms of the "WR" rating of the treated substrate. The WR rating corresponds to the most penetrating test liquid which does not penetrate or wet the substrate surface after 15 seconds exposure. Treated substrates which are penetrated by or are resistant only to a 100% water (0% isopropyl alcohol) test liquid, the least penetrating test liquid, are given a rating of 0, whereas treated substrates resistant to a 100% isopropyl alcohol (0% water) test liquid, the most penetrating test liquid, are given a rating of 10. Other intermediate ratings are calculated by dividing the percent isopropanol in the test liquid by 10, e.g., a treated substrate resistant to a 70%/30% isopropyl alcohol/water blend, but not to an 80%/20% blend, would be given a rating of 7.

Oil Repellency Test (OR)

The oil repellency of a substrate treated with a compound of the invention was measured using AATCC Test Method 118–1975, "Oil Repellency: Hydrocarbon Resistance Test", as described in AATCC Technical Manual, 1977, 53, 223. This test measures the resistance of a substrate to wetting by a series of hydrocarbon liquids with a range of surface tensions. The values reported range from 0 (least repellent) to 8 (most repellent).

Laundering Procedure

The procedure set forth below was used to prepare treated substrate samples subsequently designated in the examples below as "5 Launderings".

In this test, a 230 g sample of generally square, 400 cm² to about 900 cm² sheets of treated substrate is placed in a washing machine along with a ballast sample (1.9 kg of 8 oz fabric in the form of generally square, hemmed 8100 cm² sheets). 46 g of TIDE™ detergent (available from Proctor & Gamble) is added and the washer is filled to high water level with hot water (40° C.±3° C.). Using a 12-minute normal wash cycle, the substrate and ballast load is washed in this aqueous detergent, followed by drying together in a conventional clothes dryer adjusted to the "heat" setting for about 45 minutes. This washing and drying process is then repeated four more times. The resulting dry substrate is pressed using a hand iron set at the temperature recommended for the particular substrate fabric. Following this laundering procedure, repellency tests are run, such as the Water Spray Test, the oil Repellency Test, or the Water Repellency Test.

Bundesmann Test

The impregnating effect of rain on substrates which have been given a water repellency treatment was determined using the Bundesmann Test Method (DIN 53888). In this test, which is designed to simulate actual fabric use in the rain, the treated fabrics are subjected to a simulated rainfall while the back of the fabric samples is being rubbed; the appearance of the upper exposed surface is checked visually. The best rating (5) indicates that no water remained on the surface, while the worst rating (1) indicates complete surface wetting.

Dry Cleaning Procedure

The ability of a substrate treated with a compound of this invention to continue performing its function after being subjected to dry cleaning was determined using "3M Laboratory Dry Cleaning Procedure I," Scotchgard™ Protector, 3M Test Methods, Oct. 1, 1988. The dry cleaning procedure was followed by other performance tests such as the Water Spray Test (SR), the Oil Repellency Test (OR) or the Water Repellency Test (WR) described above.

Hydrostatic Water Repellency Test

Using the "edana test" 120.1-80, the pressure required to affect water penetration through a treated non-woven substrate subjected to a continuously increasing water pressure was measured. In this test, water repellency is related to the height (cm) of the water column when the third water drop is seen to penetrate the test material.

Evaluation of Fabric "Hand"

Treated fabrics were rated for their "hand", i.e. their softness, smoothness, pliability and fluffiness to the touch, as this feature is important for the comfort and aesthetic appeal of repellant textile substrates. A scale of 1 to 5 was used, where a rating of 1 was given to those treatments which left the fabric the softest and most natural (i.e., similar in touch to untreated fabric), while a rating of 5 was given to those treatments which gave the fabric the harshest hand (i.e., provided a rough, stiff, cardboard-like feel). Ratings of 2, 3 and 4 were assigned to intermediate hand values.

Colorfastness to Ultraviolet Light

AATCC Test Method 16-1990 was used to determine fabric treatment colorfastness to light. In this test, a sample of the treated fabric is partially covered and is exposed for one week to a water-cooled, continuous, xemon-arc light lamp (option E). The colorfastness to light of the fabric is evaluated by comparison of the color of the exposed portion to that of the unexposed (i.e. masked) control portion of the fabric, using the AATCC Gray Scale for Color Change or by instrumental color measurement. A rating is given based on a 5-point scale, varying from 5 (negligible or no color change as shown in Gray Scale Step 5) to 1 (the most severe color change as shown in Gray Scale Step 1). Intermediate values can also be given (e.g. 3.5).

Colorfastness to Dry Heat

AATCC Test Method 117-1989 was used, excluding pressing when curing the fabric. A specimen of treated fabric is exposed to dry heat during the curing cycle of 3 minutes at 150° C. in the oven. The colorfastness to heat is evaluated by comparison of the heat-treated fabric sample to an untreated, not heat-treated fabric sample using the AATCC Gray Scale for Color Change or by instrumental color measurement. As with the "Colorfastness to Ultraviolet Light" test, the conditioned fabric sample is assigned a value from 5 (best) to 1 (worst).

In the following Examples, Comparative Examples and tables, percents (%) indicate percents of fluorochemical treatment and extender by weight based on the weight of the untreated fabric substrate.

Examples 1 to 3 and Comparative Examples C1 to C3

In order to evaluate the effectiveness of the extenders of this invention compared to extenders known from the prior art, herein referred to as "comparative extenders", fluorochemical treatment FC1, used at 0.3% solids based on fabric weight, was formulated with extenders E1 to E3 (Examples 1 to 3) and with comparative extenders CE1 and CE2 (Comparative Examples C2 and C3), each at 0.1% solids.

Also, FC1 was evaluated without any extender in Comparative Example C1. Each composition was used to treat the 65/35 polyester/cotton from Test-fabrics, Inc. Each resulting treated fabric was cured for 5 minutes at 150° C. Results of these evaluations are shown in Table 8.

TABLE 8

| Ex. | Ex-tender | Initial | | Five Launderings | | One Dry Clean | | Bundesmann (Initial) | | |
|---|---|---|---|---|---|---|---|---|---|---|
| | | OR | SR | OR | SR | OR | SR | 1' | 5' | 10' |
| C1 | None | 5 | 70 | 1 | 0 | 0 | 0 | 1 | 1 | 1 |
| 1 | E1 | 5 | 100 | 5 | 90 | 0 | 70 | 5 | 5 | 4 |
| 2 | E2 | 6 | 100 | 4 | 80 | 2 | 70 | 5 | 5 | 5 |
| 3 | E3 | 5 | 100 | 2 | 50 | 0 | 50 | 5 | 3 | 2 |
| C2 | CE1 | 5 | 80 | 0 | 0 | 0 | 0 | 1 | 1 | 1 |
| C3 | CE2 | 5 | 100 | 2 | 70 | 0 | 50 | 3 | 1 | 1 |

The data in Table 8 show that when oxime-blocked extender E1 or E2 was added to FC1, a significant improvement in initial dynamic water resistance (spray rating and Bundesmann) and durability to cleaning (oil and water repellency after laundering or dry cleaning) resulted compared to Comparative Example C1 which contained no extender. Alcohol-blocked extender E3 also gave a substantial improvement in repellency performance, though less pronounced than with the oxime-blocked extenders. Comparative extender CE1, an acrylate homopolymer containing no functional groups and comparative extender CE2, an acrylate copolymer containing pendent methylol functional groups, produced a small or moderate improvement over FC1 used alone.

Examples 4 to 12 and Comparative Examples C1 and C4

Extenders E1 and E5 to E12 were evaluated along with comparative extender CE2 to replace 25% of the fluorochemical FC1 in treating the 65/35 polyester/cotton from Test-fabrics, Inc. Except for Comparative Example C1 which contains no extender, in each Example and Comparative Example the % SOF of extender was 0.075% and each treated fabric was cured for 6 minutes at 55° C. The compositions and test results are summarized in Table 9.

TABLE 9

| Ex. | % FC1 | Extender (0.075%) | Initial Repellency OR | SR | Bundesmann 1' | 5' | 10' | Five Launderings OR | SR | One Dry Clean OR | SR |
|---|---|---|---|---|---|---|---|---|---|---|---|
| C1 | 0.3 | — | 5 | 80 | 1 | 1 | 1 | 0 | 0 | 0 | 0 |
| 4 | 0.225 | E1 | 4 | 100 | 5 | 4 | 3 | 2 | 70 | 2 | 50 |
| 5 | 0.225 | E5 | 5 | 100 | 3 | 1 | 1 | 2 | 70 | 0 | 50 |
| 6 | 0.225 | E6 | 5 | 100 | 3 | 1 | 1 | 1 | 80 | 0 | 0 |
| 7 | 0.225 | E7 | 4 | 100 | 5 | 4 | 2 | 1 | 70 | 1 | 50 |
| 8 | 0.225 | E8 | 4 | 100 | 5 | 4 | 3 | 2 | 80 | 1 | 50 |
| 9 | 0.225 | E9 | 5 | 100 | 4 | 2 | 1 | 1 | 80 | 0 | 50 |
| 10 | 0.225 | E10 | 5 | 100 | 4 | 2 | 2 | 1 | 80 | — | 50 |
| 11 | 0.225 | E11 | 4 | 100 | 5 | 3 | 3 | 2 | 80 | 1 | 50 |
| 12 | 0.225 | E12 | 5 | 100 | 4 | 1 | 1 | 2 | 80 | 0 | 0 |
| C4 | 0.225 | CE2 | 4 | 100 | 1 | 1 | 1 | 0 | 50 | 0 | 0 |

The data in Table 9 show that in Examples 4 to 12, substitution of 25% of the fluorochemical treatment (FC1) with an extender of this invention enhanced nearly all of the repellent performance properties of the treatment when compared to the fluorochemical used alone (Comparative Example C1). Use of an extender outside the scope of this invention (Comparative Example C4) gave little change in performance compared to the fluorochemical treatment used alone.

Examples 13 to 15 and Comparative Examples C5 to C8

Examples 13 to 15 and Comparative Examples C6 and C8 were run to compare the effect of replacing one-third or one-half of fluorochemical treatment FC2 or FC3 with urethane extender E4 or comparative extender CE3. The treatments were all applied at 0.3% total application solids based on fabric weight (SOF). The test fabric used and the cure were as in Example 1. The compositions and test results are summarized in Table 10.

TABLE 10

| Ex. | Fluorochem., Percent | Extender, Percent | Initial OR | SR | Five Launderings OR | SR | One Dry Clean OR | SR |
|---|---|---|---|---|---|---|---|---|
| C5 | FC2 0.3 | — — | 6 | 70 | 0 | 0 | 0 | 0 |
| 13 | FC2 0.2 | E4 0.1 | 6 | 70 | 0 | 50 | 0 | 50 |
| C6 | FC2 0.2 | CE3 0.1 | 6 | 70 | 0 | 0 | 0 | 0 |
| C7 | FC3 0.3 | — — | 6 | 80 | 0 | 0 | 0 | 50 |
| 14 | FC3 0.2 | E4 0.1 | 6 | 80 | 1 | 50 | 0 | 70 |
| 15 | FC3 0.15 | E4 0.15 | 6 | 80 | 1 | 50 | 0 | 50 |
| C8 | FC3 0.15 | CE3 0.15 | 6 | 70 | 0 | 0 | 0 | 50 |

The data in Table 10 show that partial replacement of fluorochemical treatment FC2 or FC3 with extender E4 of this invention enhanced the treatment's spray resistance after laundering or dry cleaning, whereas an analogous replacement with comparative extender CE3 resulted in no improvement (Comparative Examples C6 and C8).

Examples 16 to 19 and Comparative Examples C9 to C12

Examples 16 to 19 and Comparative Examples C9 to C12 were run to compare the effect of replacing 20% of fluorochemical treatment FC4 with extender E1 of this invention. In this case, two different fabrics were evaluated, the 65/35 polyester/cotton blend from Utexbel N.V. ("PC") and the 100% polyamide D5 from Test-fabrics, Inc. ("PA"). The treatment was run at two levels: 0.375% and 0.3% total application solids based on fabric weight (SOF). Treated fabrics were cured at 150° C. for 3 minutes. Laundering procedure was as described above except the hot water was at 49° C.± 3° C. The compositions and test results are summarized in Table 11.

TABLE 11

| Ex. | % FC4 | % E1 | Fabric | Initial OR | SR | 5 Launderings OR | SR | Bundesmann 1' | 5' | 10' |
|---|---|---|---|---|---|---|---|---|---|---|
| C9 | 0.375 | — | PC | 5 | 100 | 3 | 50 | 4 | 2 | 1 |
| 16 | 0.3 | 0.075 | PC | 5 | 100 | 3 | 70 | 5 | 3 | 2 |
| C10 | 0.3 | — | PC | 4 | 100 | 3 | 50 | 2 | 1 | 1 |
| 17 | 0.24 | 0.06 | PC | 4 | 100 | 2 | 70 | 2 | 1 | 1 |
| C11 | 0.375 | — | PA | 6 | 100 | 0 | 0 | 5 | 4 | 4 |
| 18 | 0.3 | 0.075 | PA | 6 | 100 | 0 | 50 | 5 | 5 | 4 |
| C12 | 0.3 | — | PA | 5 | 100 | 0 | 0 | 5 | 4 | 4 |
| 19 | 0.24 | 0.06 | PA | 5 | 100 | 0 | 50 | 5 | 4 | 4 |

The data in Table 11 show that where extender E1 was used to replace part of the fluorochemical treatment FC4, an enhanced spray rating after laundering resulted, at no expense to the oil rating. In Example 16, an improvement in the Bundesmann test rating on polyester/cotton was evident (compared to Comparative Example C9).

Examples 20 to 22 and Comparative Example C13

Examples 20 to 22 and Comparative Example C13 were run to show the effect of replacing 20% of commercially available fluorochemical treatment FC-217-20 (commercially available from 3M Co.) with extenders E1 to E3 of this invention and treating the 65/35 polyester/cotton fabric used in Example 1 at 0.4% total solids based on fabric weight (SOF). The treated fabric was cured as in Example 1. Compositions and test results are summarized in Table 12.

TABLE 12

| Ex. | % FC-217 | Extender Name | % | Initial OR | SR | 5 Launderings OR | SR |
|---|---|---|---|---|---|---|---|
| C13 | 0.4 | — | — | 5 | 80 | 0 | 0 |
| 20 | 0.32 | E1 | 0.08 | 5 | 100 | 1 | 50 |
| 21 | 0.32 | E2 | 0.08 | 5 | 90 | 0 | 50 |
| 22 | 0.32 | E3 | 0.08 | 6 | 80 | 0 | 50 |

The data in Table 12 show that when FC-217-20 was partially replaced with extenders E1 to E3 of this invention, spray ratings were enhanced.

Examples 23 to 26 and Comparative Examples C14 to C17

Examples 23 to 26 and Comparative Examples C14 to C17 were run to compare the effect of replacing 20% of several commercially available fluorochemical treatments with extender E1 of this invention and treating 65/35 polyester/cotton used in Example 16 at 0.375% total solids based on fabric weight (SOF). The treated fabric was cured as in Example 1. Laundering procedure was as described above except the hot water was at 49° C.±3° C. Compositions and test results are summarized in Table 13.

TABLE 13

| Ex. | FC Treatment Name* | % | % E1 | Initial Repellencies OR | SR | Bundesmann 1' | 5' | 10' | 5 Launderings OR | SR |
|---|---|---|---|---|---|---|---|---|---|---|
| C14 | AG 480 | 0.375 | — | 6 | 100 | 5 | 4 | 4 | 5 | 50 |
|  | AG 480 | 0.3 | 0.075 | 6 | 100 | 5 | 5 | 5 | 4 | 80 |
| C15 | OP C | 0.375 | — | 6 | 100 | 5 | 5 | 5 | 5 | 80 |
|  | OP C | 0.3 | 0.075 | 6 | 100 | 5 | 5 | 5 | 5 | 90 |
| C16 | OP S | 0.375 | — | 6 | 100 | 5 | 4 | 3 | 5 | 70 |
|  | OP S | 0.3 | 0.075 | 6 | 100 | 5 | 5 | 5 | 6 | 80 |
| C17 | BG AFE | 0.375 | — | 6 | 100 | 5 | 4 | 4 | 5 | 70 |
|  | BG AFE | 0.3 | 0.075 | 6 | 100 | 5 | 5 | 5 | 5 | 80 |

*AG 480 is made by Asahi Glass
OP is an abbreviation for Oleophobol ™, a trademark of Ciba-Geigy
BG is an abbreviation for Baygard ™, a trademark of Bayer.

The data in Table 13 show that where extender E1 was used to replace 20% of each commercial fluorochemical treatment, spray ratings after laundering improved at no expense to the oil rating. An improvement in the Bundesmann test rating also resulted.

Examples 27 to 29 and comparative Examples C18 to C20

Examples 27 to 29 and Comparative Examples C18 to C20 were run to compare the effect of replacing 30% of fluorochemical treatment FC1 with extenders E1 to E3 of this invention and comparative extenders CE1 to CE2, when treating the 100% cotton fabric from Test-fabrics, Inc. at 0.4% solids based on fabric weight (SOF). The treated fabric was cured as in Example 1. Compositions and test results are summarized in Table 14.

repellency, before and after laundering and dry cleaning), when compared to partial replacement with comparative extenders CE1 and CE2. The effect with extender E3 (Example 29) was measurable but less dramatic, showing equivalent performance to comparative extender CE2 (Comparative Example C19). Comparative extender CE1, with no reactive functionality, showed the poorest performance (Comparative Example C20).

Examples 30 to 31 and Comparative Example C21

Examples 30 and 31 were run to show the effectiveness of partial substitution of fluorochemical treatment FC4 at 20% and 30% levels respectively with extender E1, as compared to Comparative Example C21 using FC4 alone, in treating the non-woven fabric from Lantor UK applied at 0.625% total solids based on fabric weight. The treated fabric was cured for 2 minutes at 135° C. Compositions and test results are summarized in Table 15.

TABLE 15

| Ex. | % FC4 | % E1 | Hydrostatic Water Repellency Test |
|---|---|---|---|
| C21 | 0.625 | — | 6.2 cm |
| 30 | 0.500 | 0.125 | 8.7 cm |
| 31 | 0.438 | 0.188 | 9.0 cm |

The data in Table 15 show that water repellency is significantly improved when E1, an extender of this invention, is used to partially replace FC4 fluorochemical treatment (Examples 30 and 31 vs. Comparative Example C21).

TABLE 14

| Ex. | % FC1 | Extender Name | % | Initial OR | WR | SR | 5 Launderings OR | WR | SR | 1 Dry Clean OR | WR | SR |
|---|---|---|---|---|---|---|---|---|---|---|---|---|
| C18 | 0.4 | — | — | 3 | 2 | 50 | 0 | 0 | 0 | 3 | 1 | 50 |
| 27 | 0.28 | E1 | 0.12 | 3 | 3 | 100 | 2 | 3 | 80 | 3 | 4 | 80 |
| 28 | 0.28 | E2 | 0.12 | 3 | 6 | 100 | 2 | 3 | 80 | 3 | 4 | 80 |
| 29 | 0.28 | E3 | 0.12 | 4 | 7 | 90 | 0 | 0 | 0 | 3 | 3 | 50 |
| C19 | 0.28 | CE2 | 0.12 | 5 | 5 | 70 | 0 | 0 | 50 | 2 | 1 | 70 |
| C20 | 0.28 | CE1 | 0.12 | 4 | 3 | 70 | 0 | 0 | 0 | 3 | 1 | 50 |

The data in Table 14 show that partial replacement of FC1 (Comparative Example C18) with extenders E1 or E2 of this invention (Examples 27 and 28) improved performance in all tests measured (spray rating, oil repellency, and water

Examples 32 to 35 and Comparative Examples C22 to C26

Examples 32 to 35 were run to show the effectiveness of substituting half of the fluorochemical treatment FC5 with extenders E13 to E16, compared to using FC5 alone, in treating the polyester/cotton blend used in Example 16. Comparative examples C23 to C26 were run with comparative extenders CE4 to CE7, urethane extenders which do not contain a saturated carbon-carbon backbone chain, to substitute for half of fluorochemical treatment FC5, in treating the polyester/cotton blend used in Example 16. The fabric was treated at 0.4% total solids based on fabric weight and was cured for 3 minutes at 150° C. Laundering procedure was as described above except the hot water was at 49° C.±3° C. Compositions and test results are summarized in Table 16.

ality, in treating 100% polyamide fabric from Sofinal N.V. Treatments were all applied at 0.4% total solids based on fabric weight and treated fabrics were cured for 3 minutes at 150° C. Laundering procedure was as described above except the hot water was at 49° C.±3° C. Compositions and test results are summarized in Table 17.

Comparative Examples C29 to C32

Comparative examples C29 to C32 were run with comparative extenders CE4 to CE7, urethane extenders which do not contain a saturated carbon-carbon backbone chain, to substitute for half of fluorochemical treatment FC5, in treating 100% polyamide fabric from Sofinal N.V. Treatments were all applied at 0.4% total solids based on fabric weight and treated fabrics were cured for 3 minutes at 150° C. Laundering procedure was as described above except the

TABLE 16

| | % | Extender | | Initial | | 5 Launderings | | Bundesmann | | | Colorfastness | |
|---|---|---|---|---|---|---|---|---|---|---|---|---|
| Ex. | FC5 | Name | % | OR | SR | OR | SR | 1' | 5' | 10' | Heat | Light |
| C22 | 0.4 | — | — | 4 | 90 | 1 | 0 | 1 | 1 | 1 | 4.5 | 4.5 |
| 32 | 0.2 | E13 | 0.2 | 3 | 100 | 2 | 70 | 4 | 2 | 1 | 4.5 | 4 |
| 33 | 0.2 | E14 | 0.2 | 3 | 90 | 1 | 50 | 2 | 1 | 1 | 4.5 | 4 |
| 34 | 0.2 | E16 | 0.2 | 2 | 100 | 2 | 70 | 3 | 2 | 1 | 4.5 | 4 |
| 35 | 0.2 | E16 | 0.2 | 4 | 100 | 3 | 80 | 4 | 3 | 2 | 4.5 | 4 |
| C23 | 0.2 | CE4 | 0.2 | 4 | 100 | 1 | 50 | 3 | 1 | 1 | 4.5 | 4 |
| C24 | 0.2 | CE5 | 0.2 | 3 | 100 | 2 | 90 | 5 | 4 | 4 | 4 | 4 |
| C25 | 0.2 | CE6 | 0.2 | 3 | 100 | 2 | 70 | 5 | 4 | 3 | 4.5 | 4 |
| C26 | 0.2 | CE7 | 0.2 | 3 | 100 | 3 | 90 | 5 | 4 | 4 | 3.5 | 3.5 |

The data in Table 16 show that partial replacement of FC5 with extenders E13 to E16 of this invention improved most of the test results, with most dramatic improvement noted in the Bundesmann test results.

Although repellency test results using the comparative extenders in Comparative Examples C23 to C26 were generally good, the colorfastness to heat and light were somewhat inferior to that shown by extenders E13 to E16 of this invention.

hot water was at 49° C.± 3° C. Compositions and test results are summarized in Table 17.

TABLE 17

| | % | Extender | | Initial | | 5 Launderings | | Bundesmann | | | |
|---|---|---|---|---|---|---|---|---|---|---|---|
| Ex. | FC5 | Name | % | OR | SR | OR | SR | 1' | 5' | 10' | Hand |
| C27 | 0.4 | — | — | 2 | 100 | 0 | 0 | 4 | 3 | 3 | 2 |
| 36 | 0.2 | E13 | 0.2 | 3 | 100 | 2 | 85 | 5 | 5 | 4 | 3 |
| 37 | 0.2 | E14 | 0.2 | 3 | 100 | 2 | 50 | 5 | 4 | 4 | 4 |
| 38 | 0.2 | E15 | 0.2 | 3 | 100 | 2 | 80 | 5 | 5 | 5 | 2 |
| 39 | 0.2 | E16 | 0.2 | 4 | 100 | 2 | 70 | 5 | 5 | 5 | 1 |
| C28 | 0.2 | CE1 | 0.2 | 3 | 100 | 0 | 0 | 4 | 3 | 2 | 4 |
| C29 | 0.2 | CE4 | 0.2 | 4 | 100 | 3 | 0 | 2 | 1 | 1 | 1 |
| C30 | 0.2 | CE5 | 0.2 | 3 | 100 | 2 | 90 | 5 | 5 | 4 | 5 |
| C31 | 0.2 | CE6 | 0.2 | 3 | 100 | 2 | 85 | 5 | 5 | 5 | 2 |
| C32 | 0.2 | CE7 | 0.2 | 3 | 100 | 2 | 90 | 5 | 5 | 5 | 4 |

Examples 36 to 39 and Comparative Examples C27 and C28

Examples 36 to 39 were run to show the effectiveness of substituting half of the fluorochemical treatment FC5 with extenders E13 to E16, as compared to Comparative Example C27, using FC5 alone, and Comparative Example C28, where substitution for FC5 was made with comparative extender CE1 which contains no reactive urethane function- The data in Table 17 show that partial replacement of FC5 with extenders E13 to E16 of this invention improved overall repellency performance of the treatment on the polyamide fabric while causing little or no deterioration in hand (extender E16 gave no change at all in hand from untreated fabric).

Substitution of FC5 with comparative extender CE1, an acrylic polymer containing no reactive groups, caused deterioration in fabric repellency as well as the development of a harsh hand.

The data in Table 17 show that comparative extender CE4, when used with FC-5, gave excellent hand but was a relatively poor repellant. Also, although comparative extenders CE5 to CE7 were very good repellents, they gave a harsher hand to the fabric.

The above described performance results evidence that compositions of this invention comprising fluorochemicals and urethane monomer-containing copolymers exhibit excellent performance as repellent treatments. Compared to the fluorochemical treatments used alone, the compositions of this invention provide superior water repellency and durability with no loss in oil repellency.

Various modifications and alterations of this invention will become apparent to those skilled in the art without departing from the scope and spirit of this invention. It should be understood that this invention is not to be unduly limited to the embodiments set forth herein.

What is claimed is:

1. A fluorine-efficient oil- and water-repellent treatment composition comprising:
   (A) a fluorochemical oil- and water-repellent agent; and
   (B) a polymer extender comprising a saturated carbon-carbon backbone chain and at least one percent by weight, based on the weight of the extender, of interpolymerized units derived from ethylenically-unsaturated monomer containing at least one blocked or masked isocyanato group or function.

2. The composition of claim 1 wherein said polymer extender further comprises interpolymerized units derived from ethylenically-unsaturated monomer free of blocked or masked isocyanato groups or functions.

3. The composition of claim 1 wherein said ethylenically-unsaturated monomer containing at least one blocked or masked isocyanate function is

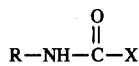

wherein R is a monovalent organic residue containing at least one ethylenically unsaturated polymerizable group, and X is the radical fragment remaining after an active hydrogen atom is removed from a blocking or masking agent HX.

4. The composition of claim 1 wherein said ethylenically-unsaturated monomer containing at least one blocked or masked isocyanate function is

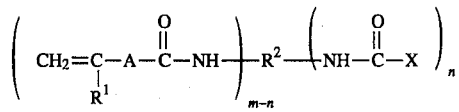

wherein n is 1 to 3, $R^1$ is a hydrogen atom or a methyl group, A is a divalent linking group, $R^2$ is a bi-, tri- or tetravalent organic residue of valence m derived from a bi-, tri- or tetrafunctional aliphatic, cycloaliphatic, aromatic or heterocyclic isocyanate compound $R^2(NCO)_m$, X is the radical fragment remaining after an active hydrogen atom is removed from a blocking or masking agent HX, and m–n is 1, 2, or 3.

5. The composition of claim 2, wherein said ethylenically-unsaturated monomer free of blocked or masked isocyanato groups or functions is selected from the group consisting of acrylic or methacrylic ester monomers, acrylamide or methacrylamide monomers, acrylonitrile, methacrylonitrile or vinylidene chloride.

6. The composition of claim 4, wherein said $R^2$ is the residue from isophorone diisocyanate or toluene diisocyanate.

7. The composition of claim 4, wherein A is —COOC$_2$H$_4$O—.

8. The composition of claim 3, wherein said X is the radical fragment remaining after an active hydrogen atom is removed from an oxime, an alcohol, a phenol, or a lactam.

9. The composition of claim 4, wherein said X is the radical fragment remaining after an active hydrogen atom is removed from an oxime, an alcohol, a phenol, or a lactam.

10. The composition of claim 3, wherein said R is m-isopropenyl dimethylbenzyl, methacryloyl, or methacryloxyethyl.

11. The composition of claim 4, wherein X is the radical fragment remaining after the active hydrogen atom is removed from 2-butanone oxime.

12. The composition of claim 1, wherein said fluorochemical agent is present in an amount of 20 to 2,000 parts by weight based on 100 parts by weight of said polymer extender.

13. The composition of claim 12, wherein said fluorochemical agent is present in an amount of 100 to 400 parts by weight based on 100 parts by weight of said copolymer extender.

14. A substrate with oil- and water-repellent properties comprising a fibrous substrate having on a surface thereof an amount of the composition of claim 1 sufficient to impart oil- and water-repellent properties thereto.

15. The substrate of claim 14, wherein said substrate is paper, non-woven, cotton, a polyester/cotton blend, nylon, wool, or leather.

16. The substrate of claim 14, wherein said fluorochemical agent and said polymer extender are present in a total combined amount of 0.02 to 3% by weight based on the weight of the untreated substrate.

17. An aqueous dispersion comprising an amount of the composition of claim 1 sufficient to provide repellent properties to a substrate treated therewith, and an emulsifier in an amount effective to stabilize the dispersion.

18. An aqueous dispersion according to claim 17, wherein water is present in an amount of 70 to 900 parts by weight based on 100 parts by weight of the composition, and the emulsifier is present in an amount of 3 to 15 parts by weight, based on 100 parts by weight of the composition.

19. A method for imparting oil- and water-repellent properties to a fibrous substrate, comprising the steps of:
   (1) applying to a surface of said fibrous substrate an amount of the composition of claim 1 sufficient to impart oil- and water-repellent properties thereto, wherein said fluorochemical agent and said polymer extender are present on said substrate in a total combined amount of 0.02% to 3% by weight based on the weight of the untreated substrate material; and
   (2) heating the treated substrate from step (1) at a temperature and for a time sufficient to cure the treated substrate.

20. The method of claim 19, wherein said heating is at a temperature from 110° to 190° C. for 20 seconds to 10 minutes.

* * * * *

UNITED STATES PATENT AND TRADEMARK OFFICE
CERTIFICATE OF CORRECTION

PATENT NO.: 5,466,770

DATED: November 14, 1995

INVENTOR(S): Frans A. Audenaert, Rudolf J. Dams and Robert F. Kamrath

It is certified that error appears in the above-identified patent and that said Letters Patent is hereby corrected as shown below:

Column 3, line 28, delete "$R_2(NCO)_m$" and insert --$R^2(NCO)_m$--.

Column 3, line 49, delete "$R_2(NCO)_m$" and insert --$R^2(NCO)_m$--.

Table 13, delete "EX
C14

C15

C16

C17" and insert --EX
C14
23
C15
24
C16
25
C17
26--

Signed and Sealed this

Fourteenth Day of May, 1996

Attest:

BRUCE LEHMAN

*Attesting Officer*     *Commissioner of Patents and Trademarks*